United States Patent [19]

Cronenwett et al.

[11] Patent Number: 4,766,659
[45] Date of Patent: Aug. 30, 1988

[54] METHOD OF MAKING A CARTRIDGE FOR USE IN INJECTING A LIQUID INTO A TREE

[76] Inventors: Duane Cronenwett, 725 Hummingbird Way, North Palm Beach, Fla. 33408; Robert W. Gottfried, 748 Hi Mount Rd., Palm Beach, Fla. 33480

[21] Appl. No.: 59,512

[22] Filed: Jun. 8, 1987

Related U.S. Application Data

[62] Division of Ser. No. 841,240, Mar. 19, 1986, Pat. No. 4,698,935.

[51] Int. Cl.⁴ .................. B21K 21/16; A01G 29/00; A01G 7/06
[52] U.S. Cl. .................................. 29/401.1; 47/57.5
[58] Field of Search .................. 29/1.21, 401.1; 47/1, 47/48.5, 57.5, 58, DIG. 4, DIG. 5; 604/413

[56] References Cited

U.S. PATENT DOCUMENTS

| | | | |
|---|---|---|---|
| 1,999,458 | 4/1935 | Hollister | 47/57.5 |
| 2,116,591 | 5/1938 | Barber | 47/57.5 |
| 3,069,809 | 12/1962 | Simmons | 47/57.5 |
| 3,367,065 | 2/1968 | DuVal et al. | 47/57.5 |
| 3,576,065 | 4/1971 | Clarke et al. | 47/57.5 |
| 3,691,683 | 9/1972 | Sterzik | 47/57.5 |
| 3,706,161 | 12/1972 | Jenson | 47/57.5 |
| 3,864,874 | 2/1972 | Norris | 47/57.5 |
| 4,169,475 | 10/1979 | Genese | 604/413 |
| 4,308,689 | 1/1982 | Jenson et al. | 47/57.5 |
| 4,342,176 | 8/1982 | Wolfe | 47/57.5 |

FOREIGN PATENT DOCUMENTS

| | | | |
|---|---|---|---|
| 628889 | 10/1961 | Canada | 47/57.5 |
| 891750 | 3/1944 | France | 47/57.5 |
| 8302998 | 3/1985 | Netherlands | 47/57.5 |
| 151146 | 3/1961 | U.S.S.R. | 47/48.5 |

Primary Examiner—Timothy V. Eley
Attorney, Agent, or Firm—Leonard Bloom

[57] ABSTRACT

A metal cartridge is driven into a downwardly-inclined bore in the trunk of a tree, and a hypodermic needle is inserted through a mass of sealable material carried by the rearward end portion of the cartridge and accessible externally thereof. Preferably, the sealable material comprises silicone which is room temperature vulcanizable ("RTV") and may be color coded to readily indicate to the operator the successive stages in the innoculation or other treatment of the tree.

The needle is closely guided through the RTV by means of a restricted diameter bore and counterbore in the cartridge, and the liquid is injected into the cartridge and flows out the forward open end thereof. In a preferred embodiment, the cartridge comprises a rifle cartridge from which the primer has been removed. The cartridge is rugged and reliable, inexpensive, and may be driven into the tree trunk by a hammering action.

In an alternate method, adapted for small diameter trees, the open end of the cartridge is secured to one end of a flexible tube, and the other end of the tube is connected to the free end of a accessible root of the tree. The connections are made by respective hose clamps. The flexible tube acts as a reservoir from which the root may "feed" as desired.

1 Claim, 4 Drawing Sheets

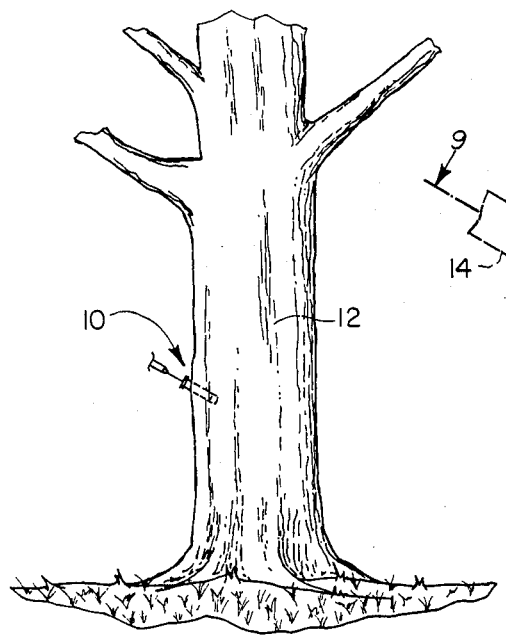
Fig. 1
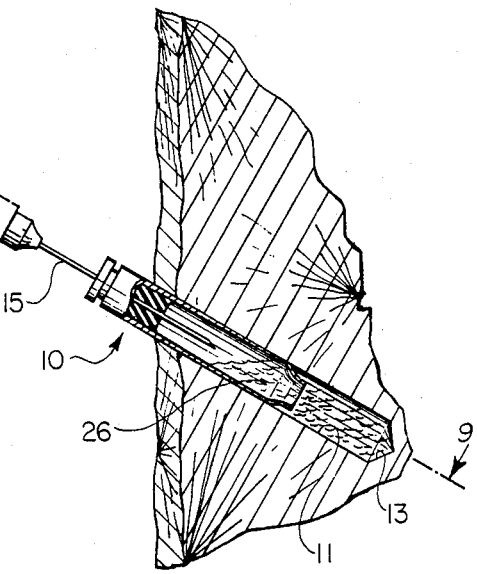
Fig. 2
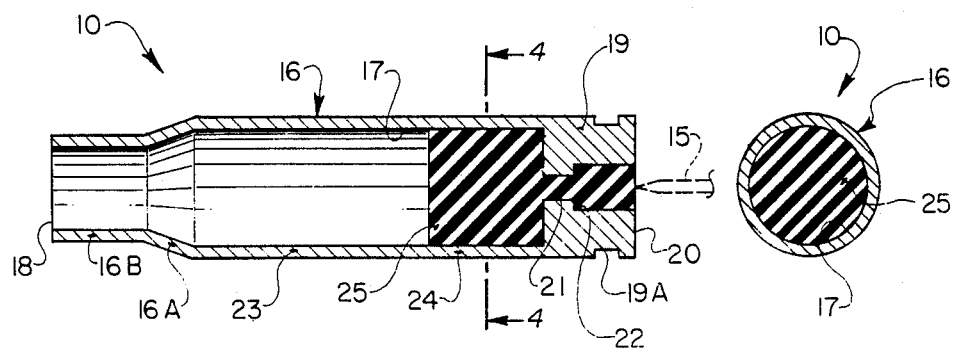
Fig. 3
Fig. 4

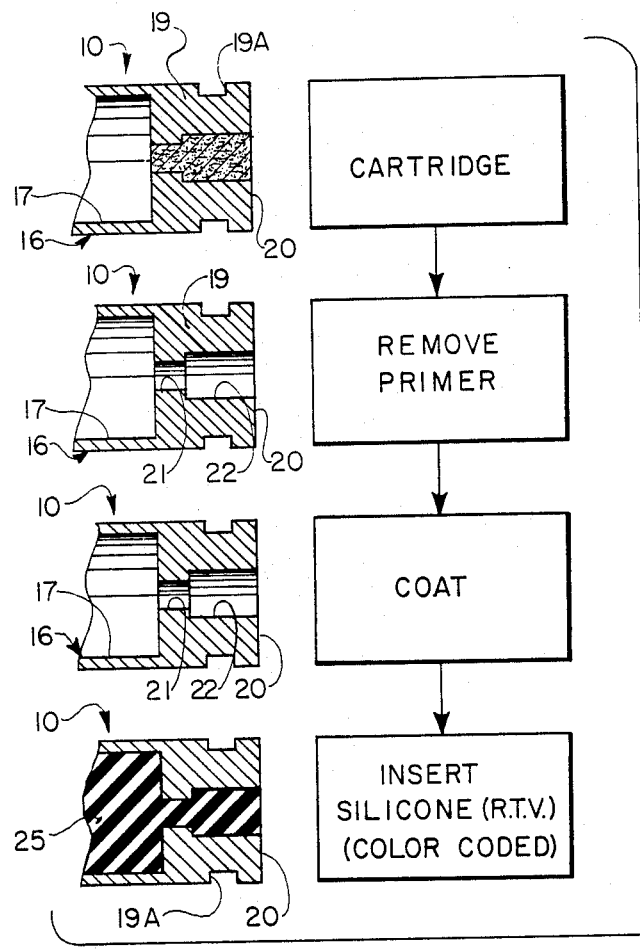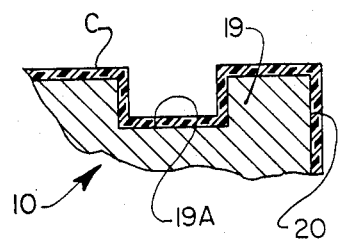
Fig. 5
Fig. 5A
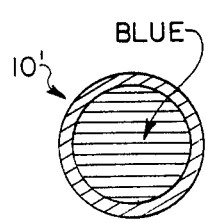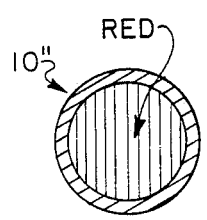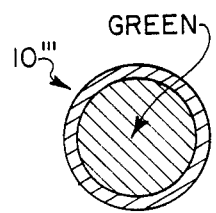
Fig. 6  Fig. 7  Fig. 8

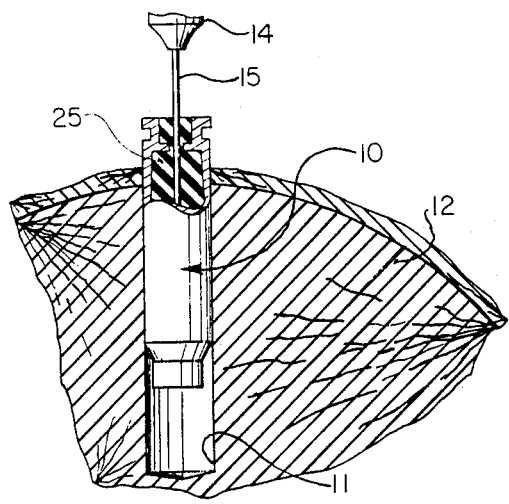
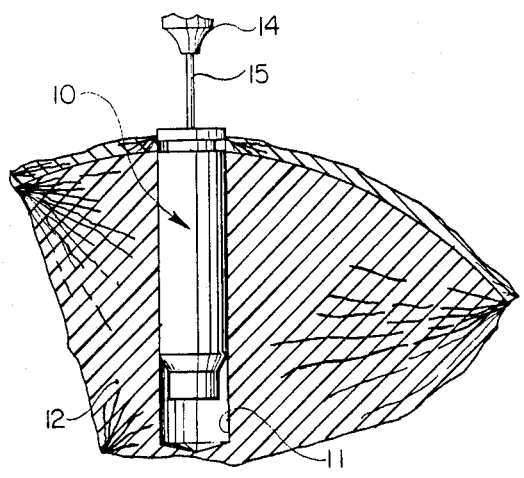
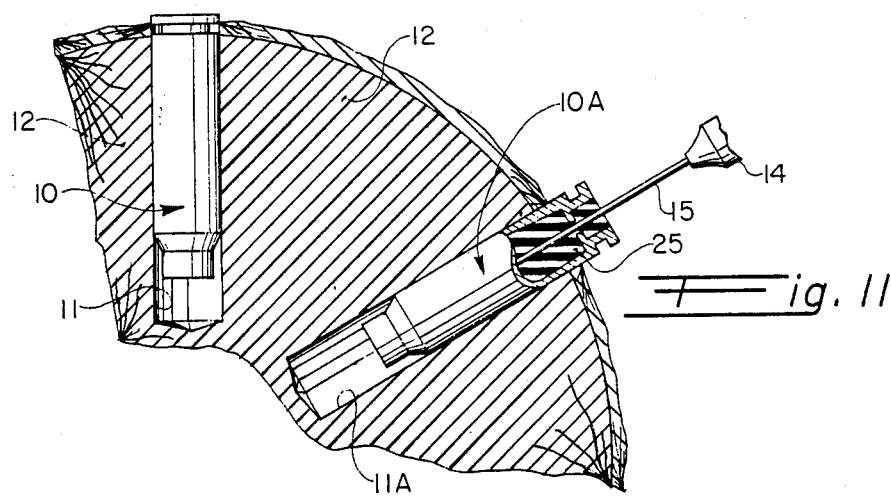
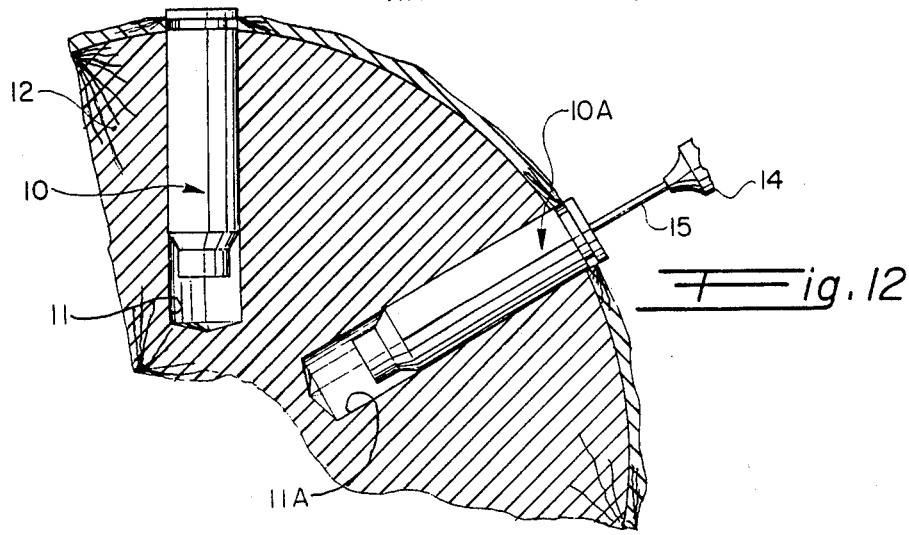

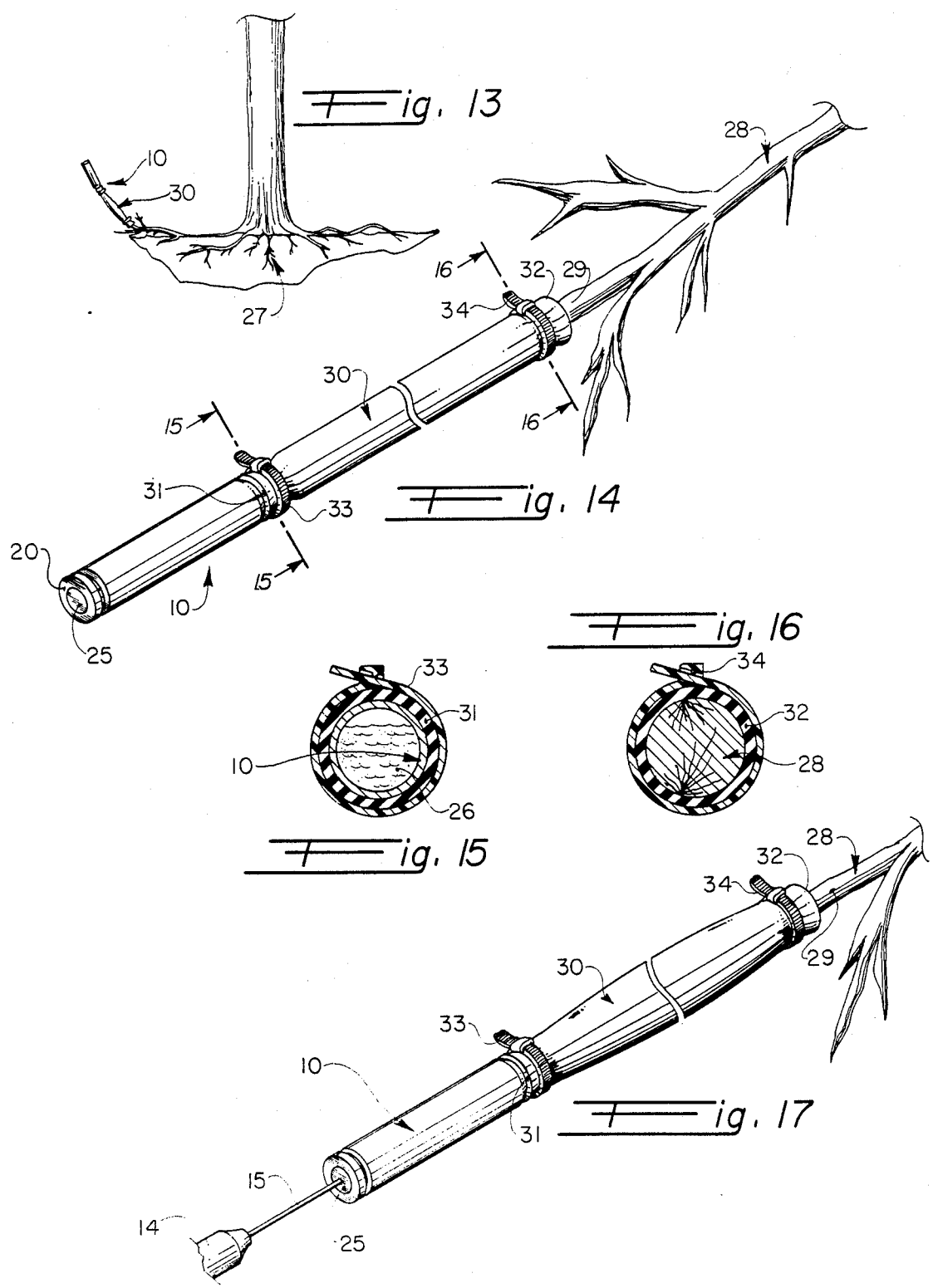

METHOD OF MAKING A CARTRIDGE FOR USE IN INJECTING A LIQUID INTO A TREE

This application is a division of application Ser. No. 841,240 now U.S. Pat. No. 4,698,935 filed March 19, 1986.

FIELD OF THE INVENTION

The present invention relates to an apparatus and method for in noculating trees with medication or nutriments, and more particularly, to an improved apparatus and method for injecting a liquid into the trunk of a tree, or into the accessible free end of the root of a small tree, utilizing in each case a metallic cartridge that is readily available.

BACKGROUND OF THE INVENTION

Like humans and other animals, plant life such as trees are susceptible to becoming afflicted with various diseases. Sometimes the trees may be saved with proper treatment; but it is often more effective to innoculate the trees in the first instance to provide an immunity against various diseases.

For example, a disease called "lethal yellowing" has caused the destruction of most of the coconut palms in South Florida. Lethal yellowing is a virus-like disease which is usually incurable. It is spread by a small insect called a leaf hopper which is carried by the wind. The trees afflicted with the disease of lethal yellowing exhibit the following symptoms: the fronds turn bright yellow and drop; the orange flowers turn brown; and the coconuts darken and drop. Other varieties of palm trees are also susceptible.

This disease started in the Florida Keys and rapidly spread northward. Since 1972, according to published statistics, 95% of the coconut palms in Dade County, 85% in Broward County and 75% in Palm Beach County have died fom lethal yellowing. Within the latter county, the town of Palm Beach has pumped hundreds of gallons of the antibiotic tetracycline into its palm trees and has spent over a million dollars since 1972 in innoculating its trees against this dreaded disease. The residents of Palm Beach are very proud of their beautiful arching palm trees and are determined to preserve them.

In the prior art, various devices and instruments have been employed for injecting a liquid into a tree or other plant for th purpose of destroying insects which infest the tree, innoculating the tree against various diseases (such as lethal yellowing), and providing nourishment to stimulate growth. Generally, an opening is bored into the trunk of the tree, and the liquid is injected into the tree under pressure by means of a suitable coupling, such as the needle of a hypodermic syringe. Examples of this known prior art are U.S. Pat. Nos. 1,756,453; 2,116,591; 3,864,874; 4,011,685; and 4,342,176.

In the aforementioned '874 patent, a horizontal bore and a countrbore (or countersink) are drilled into the trunk of the tree, and a plastic capsule is pressed into the bore and is retained therein by a frictional fit. The capsule has a flange portion seated on a rubber gasket in the counterbore, thereby providing a seal to preclude the escape of liquid out of the capsule. A hypodermic needle is forced through the end wall of the capsule, creating a small opening therein to inject the liquid into the capsule, and the needle is subsequently withdrawn. The liquid passes through openings formed in the cylindrical wall of the capsule, intermediate its ends, and into the cambiem layer in the tree.

Generally speaking, these prior art methods are somewhat cumbersome and costly and are not totally effective in injecting a liquid into a tree for the purpose of providing nutriment to the tree, innoculating the tree against diseases such as lethal yellowing, or for other purposes.

SUMMARY OF THE INVENTION

Accordingly, it is an object of the present invention to alleviate the disadvantages and deficiencies of the prior art by providing a simple, reliable, inexpensive, and yet effective apparatus and method for injecting a liquid or other material into a tree, either into the trunk or through its root system.

It is another object of the present invention to provide a superior apparatus and method for the treatment of trees, such as innoculating the tree to provide an immunity against various diseases that afflict trees, as for example, the lethal yellowing of coconut palm trees.

It is yet another object of the present invention to provide a superior apparatus and method for injecting nutriments or needed minerals into a tree.

While not necessarily restricted thereto, the present invention finds more particular utility in a tree injection system, wherein a liquid is intended to be injected by a needle through a cartridge into a tree, the cartridge being adapted to be inserted into an elongated blind bore formed in the tree, the bore having a bottom and further having substantially cylindrical walls, and the cartridge being substantially anchored in the bore. In accordance with the teachings of the present invention, there is herein illustrated and described, a preferred embodiment thereof, wherein the improvement comprises a metal cartridge including a main body portion formed as a shell. The shell has a central longitudinal opening therein; and the shell further has an open forward end, such that the central longitudinal opening in the shell communicates with the interior of the tree. The central longitudinal opening in the shell includes a forward axial section and a rearward axial section. The cartridge further has a rearward end portion formed integrally with the shell and including a rearward end face. The rearward end portion of the shell has a central bore formed therein and further has a counterbore opening outwardly to the rearward end face. The central bore in the rearward end portion communicates the counterbore with the central longitudinal opening in the shell. A mass of resealable material substantially fills the boe and the counterbore in the rearward end portion of the cartridge, and the mass of resealable material further substantially fills at least the rearward axial section of the central longitudinal opening in the shell. With this arrangement, the needle may be inserted longitudinally through the mass of resealable material in the cartridge and into the forward axial section of the central longitudinal opening in the shell for injecting a liquid through the open forward end of the shell and into the tree. The needle may be subsequently withdrawn from the cartridge, such that the mass of resealable material substantially seals upon itself and precludes liquid from escaping out of the cartridge.

In the preferred embodiment, the cartridge comprises a rifle cartridge from which the primer has been removed, the rifle cartridge having a substantially cylindrical shell. The cartridge is made of brass and is coated to obscure the brass color and to blend in with the color of the tree. Preferably, the mass of resealable material comprises silicone which is room temperature vulcanizable ("RTV"). The mass of RTV may be color coded so that in using the cartridge, the successive stages in the injection of liquid into the tree may be readily identified.

In accordance with the further teachings of the present invention, there is herein illustrated and described an improved method of injecting a liquid into a tree, which includes the following steps: A downwardly-inclined transverse blind bore is drilled in the trunk of the tree, the bore having a bottom within the trunk. A metallic cartridge in the form of a cylindrical shell is provided. The cartridge has an open forward end and further has an integral rearward end portion which provided with a mass of sealable material. This sealable material is accessible externally of the cartridge and provides a seal for the cartridge. The cartridge is hammered into the bore in the trunk of the tree, such that the cartridge is press-fitted within the bore. The hammering of the cartridge is terminated at a point such that the open forward end of the cartridge is spaced from the bottom of the bore, and such that the rearward end of the cartridge extends outwardly of the trunk of the tree. A needle is inserted through the mass of sealable material in the rearward end of the cartridge, and the needle is used to inject a substantially predetermined dosage of a liquid into the tree. The liquid flows through the shell, and out of the open forward end of the shell, and into the space between the forward end of the shell and the bottom of the bore in the trunk of the tree. The needle is withdrawn from the cartridge, such that the mass of sealable material substantially closes upon itself to form a seal.

Preferably, the cartridge comprises a first cartridge, and the sealable material in the first cartridge has a given color. The improved method further includes the steps of injecting a second dosage through the first cartridge and into the tree, and thereafter driving the first cartridge substantially flush with the trunk of the tree.

The improved method still further includes the steps of providing a second cartridge which is substantially identical to the first cartridge, but wherein the sealable material therein has a different color. A second bore is formed in the trunk of the tree at substantially the same height as the first bore but circumferentially displaced therefrom around the trunk of the tree. The second cartridge is hammered into the second bore, and the hammering of the second cartridge is terminated at a point where the rearward end portion of the second cartridge extends outwardly of the trunk of the tree. A needle is inserted through the mass of sealable material in the rearward end portion of the second cartridge, and the needle is used to inject a substantially predetermined dosage of a liquid through the second cartridge and into the tree. The improved method still further includes the step of injecting a second dosage through the second cartridge and into the tree, and thereafter driving the second cartridge substantially flush with the trunk of the tree.

In certain cases, the trunk of the tree has a relatively small diameter, so that it is impractical to insert a cartridge into the trunk of the tree. However, in accordance with the still further teachings of the present invention, there is herein illustrated and described an improved method which includes the following steps: An accessible root is lifted out of the ground, such that the end of the root is free. A substantially flexible tube is provided having a pair of ends. One end of the tube is slipped over the free end of the root and secured thereto. A cartridge is provided having an open forward end. The other end of the tube is slipped over the open forward end of the cartridge and secured thereto. A liquid is injected into the cartridge, such that the liquid passes through the open end of the cartridge through the tube and into the free end of the root.

Preferably, the cartridge has a rearward portion including therein a silicone material accessible externally of the cartridge. A hypodermic needle is inserted through the silicone material and into the cartridge; and a liquid is injected from the needle through the cartridge, through the tube, and into the free end of the root. The needle is withdrawn from the cartridge, such that the silicone material reseals itself and substantially precludes the injected liquid from escaping from the cartridge. Preferably, the tube is flexible and is connected by suitable hose clamps to the root and cartridge, respectively, and the cartridge constitutes a reservoir for the liquid injected into the cartridge, thereby allowing the root to "feed" as desired.

These and other objects of the present invention will become apparent from a reading of the following specification, taken in conjunction with the enclosed drawings.

BRIEF DESCRIPTION OF THE DRAWINGS

FIG. 1 is a pictorial view of a trunk of a tree, showing a cartridge of the present invention inserted into a downwardly-inclined bre drilled into the trunk of the tree.

FIG. 2 is a portion of the tree trunk of FIG. 1, drawn to an enlarged scale, the broken lines illustrating a portion of a hypodermic syringe having a needle inserted into the cartridge for the purpose of injecting a liquid into the tree trunk.

FIG. 3 is a longitudinal section of the improved cartridge of the present invention, the broken lines indicating a portion of the needle.

FIG. 4 is a sectional view, taken across the lines 4—4 of FIG. 3.

FIG. 5 is a schematic block diagram, constituting a flow chart of the preferred process used for making the cartridge of the present invention, a portion of the cartridge being shown alongside each of the blocks for clarity of understanding.

FIG. 5A is a portion of FIG. 5, drawn to an enlarged scale, and showing the coating applied to the external surface of the cartridge.

FIGS. 6, 7 and 8 are further cross-sectional views of the cartridge, substantially corresponding to FIG. 4, but illustrating how the cartridge may be color coded (as for example, blue, red and green, respectively).

FIG. 9 is a sectional view taken across the lines 9—9 of FIG. 2 and illustrates the use of a first cartridge in the first stage of injecting a liquid into the tree for innoculation or other purposes, the hammering of the first cartridge into the bore in the trunk of the tree having been terminated at a point where the rearward end portion of the first cartridge is allowed to extend beyond the surface of the tree trunk, thereby subsequently indicating to the operator that a first injection ha been made.

FIG. 10 corresponds substantially to FIG. 9, but illustrates a second stage wherein after a second injection (which may occur, for example, three months after the first injection) the first cartridge is driven further into the tree trunk so that the rearward end face of the first cartridge is substantially flush with the tree trunk.

FIG. 11 illustrates a third stage, wherein a second cartridge has been used, preferably substantially at the same height as the first cartridge but circumferentially displaced therefrom, the sealable material in the second cartridge having a different color than that of the first cartridge, and the second cartridge protruding slightly outwardly of the tree trunk, thereby constituting a signal to the operator that a third injection has been made.

FIG. 12 illustrates a fourth stage, wherein the second cartridge has been driven flush with the tree trunk following a second injection into the second cartridge.

FIG. 13 illustrates the use of the apparatus of the present invention to inject a liquid into the free end of one of the roots of a relatively small tree.

FIG. 14 is a pictorial view, drawn to an enlarged scale, and showing the use of a flexible tube connected between the forward open end of the cartridge and the free end of an accessible root of the tree.

FIG. 15 is a sectional view, taken across the lines 15—15 of FIG. 14 and drawn to an enlarged scale, and showing the use of a first hose clamp to secure the one end of the flexible to the forward open end of the cartridge.

FIG. 16 is a sectional view, taken across the lines 16—16 of FIG. 14 and drawn to an enlarged scale, end showing the use of a second hose clamp to secure the other end of the flexible tube to the free end of the root.

FIG. 17 is a further pictorial view, corresponding substantially to FIG. 14, but showing a needle inserted into the cartridge for injecting a liquid therein, and further showing how the flexible tube may become somewhat enlarged to function as a reservoir for the injected liquid, thereby allowing the root to "feed" as desired.

GENERAL DESCRIPTION OF THE PREFERRED EMBODIMENTS

With reference to FIGS. 1-4, the apparatus of the present invention includes a cartridge 10 adapted to be inserted into a bore 11 formed in the trunk 12 of a tree. The bore is downwardly-inclined as shown more clearly in FIG. 2, and the cartridge is hammered (like a nail) or otherwise driven into the bore and is retained therein by a frictional press-fit, such that the cartridge is spaced from the bottom 13 of the bore. As hereinafter described, a hypodermic syringe 14 having a needle 15 is used to inject a liquid (or other material) into the tree. It will be appreciated by those skilled in the art, however, that in lieu of the syringe, a pressurized cylinder or a manually-actuated "grease gun" may also be employed consonant with the teachings of the present invention. It will also be appreciated that the injection may be for the purpose of innoculating the tree against various diseases to which the tree may become susceptible.

With this in mind, and with reference again to FIG. 3 the cartridge 10 includes a main body portion formed as a cylindrical shell 16. The shell has a necked-down tapered portion 16A formed integrally with a smaller diameter forward portion 16B, and the shell further has a central longitudinal opening 17 therein. The cartridge further has a forward open end 18 and an integral rearward end portion 19. The rearward end portion has an annular groove 19A and further has a rearward end face 20. The rearward end portion of the cartridge has a bore 21 and a counterbore 22 formed therein. The counterbore opens to the rearward end face of the cartridge, and the bore communicates the counterbore with the central longitudinal opening in the cylindrical shell. The central longitudinal opening has a forward axial section 23 and a rearward axial section 24.

A substantially single mass of sealable material 25 substantially fills the bore and the counterbore in the rearward end portion of the cartridge, and substantially fills the rearward axial section of the cylindrical shell in the cartridge, as shown more clearly in FIG. 3. Preferably, this sealable material comprises a silicone-based material which is room temperature vulcanizable (and is known in the art as "RTV"). When the needle is inserted into the cartridge and extends through the mass of silicone (as shown in FIG. 2 and as hereinafter described in detail), and when the needle is withdrawn from the cartridge following the injection of the liquid 26 into the tree (again as shown more clearly in FIG. 2), the silicone will tend to seal upon itself and will close the opening (which is created by the needle as the needle punctures the silicone) to thereby substantially preclude the liquid from escaping from the tree trunk.

Preferably, the cartridge 10 comprises a metallic cartridge, such as a brass rifle cartridge (either new or "spent"). Thus the cartridge is readily available, relatively inexpensive, rugged, reliable and durable, and may be driven into the drilled bore of the tree trunk (much like hammering a nail therein). Nor will the cartridge decay or crumble over the passage of time. In one preferred embodiment, the cartridge comprises a rifle cartridge for a 0.223 bullet of the type supplied to the U.S. Army. The 0.223 Army cartridge has a ⅜" O.D., and is driven into a 5/16" hole bored into the tree, thereby forming a frictional press-fit. A paint or other coating on the outer surface of the cartridge helps to provide a better "seizure" between the cartridge and the bore, and this makes it even more difficult for kids to pull the cartridge out of the tree. However, other sizes of rifle cartridges may be employed for various tree sizes, consonant with the teachings of the present invention.

When the needle 15 is inserted into the cartridge 10, the needle must be centered so as to puncture the sealable material ("RTV") 25, and more particularly, the portion thereof which is substantially flush with the rearward end face 20 of the cartridge and disposed centrally thereof. The needle then continues through the sealable material in the counterbore and (relatively narrow) bore, respectively. Thus the needle is closely piloted within the cartridge, so that the needle will be precluded from skewing obliquely within the cartridge. With the plastic capsules of the prior art, the needle may skew off center and go through the side of the capsule, possibly resulting in breakage of the needle and either loss or misapplication of the liquid.

With reference to FIGS. 5 and 5A, the sequence of steps in the method of preparing the cartridge for use herein will become more readily apparent. A suitable rifle cartridge is provided and the conventional primer is removed therefrom. The cartridge is then coated so as to obscure the brass color and allow the cartridge to blend in with the tree trunk and/or the surrounding environment (as well as providing a better press-fit). Thus the cartridge (when driven into the tree) will become relatively inconspicuous and its shiny brass color will be camouflaged so as to avoid any "attractive nuisance" to children or others in the neighborhood. In a preferred embodiment, the cartridges were coated with a gray paint C (as shown in FIG. 5A) to blend in with the usual gray appearance of the trunk of the coconut palm trees. However, any suitable color may be employed. Thereafter, the silicone ("RTV") 25 is inserted into cartridge. As will be appreciated from FIG. 3 of the drawings, the end of the cartridge 10 is not closed, but rather has an open forward end 18. Thus, it is relatively easy to remove the primer normally provided with the cartridge 10; and then fill the cartridge 10 with the RTV 25, as shown in FIG. 3. Thereafter, the cartridge 10 may be painted if desired. The process is simple, reliable and inexpensive.

With reference to FIGS. 6-8, a different color silicone (RTV) may be employed to conveniently color code the cartridges for a purpose hereinafter described. Thus, in FIG. 6, a blue color is used for cartridge 10′; in FIG. 7 red is used for cartridge 10″; and in FIG. 8 green is used for cartridge 10‴. Other colors may be used, if desired.

With reference to FIGS. 9-12, the preferred method for injecting a liquid into the tree trunk (in respective stages) is therein illustrated. These respective stages may represent, for example, the sequence in which the tree is innoculated at periodic intervals. In the preferred embodiment, these successive innoculations for the coconut palms occurred at three-month intervals. Thus, in FIG. 9, the cartridge 10 is inserted substantially within the bore 11 in the tree trunk 12, but the hammering or driving of the cartridge into the bore is terminated at a point where substantially the rearward end portion of the cartridge extends or protrudes beyond the surface of the tree trunk, taking into account of course the coarseness or grooves that are found in a typical tree trunk. In a typical example, the rearward end portion of the cartridge may extend about ⅜″. FIG. 9 thus signifies to the operator that a first injection has been made in the process of innoculating the tree (or other treatment thereto). A second injection may occur, for example, three months thereafter. After the second injection has been made, the operator drives the cartridge substantially flush with the surface of the tree trunk, as shown more clearly in FIG. 10. When the operator again inspects the tree, prior to giving the tree a third injection, the flush appearance of the first cartridge 10 readily indicates to the operator that a second injection (or innoculation) has already been applied to this first cartridge. Thereafter, the operator inserts a second cartridge 10A in a second bore 11A in the tree trunk, as shown more clearly in FIG. 11. This second bore may be at substantially the same height as the first bore, as for example, four feet from the ground level. The second bore is circumferentially displaced from the first bore around the tree trunk by about nine inches or so, depending upon the size of the tree. A third injection (or innoculation) is made, which might be at the six-month interval; and the second cartridge protrudes out of the tree trunk by ⅜″ or so (similarly to the first cartridge in FIG. 1) thereby indicating to the operator that the third "shot" has been applied. Thereafter, and perhaps at the nine-month interval, a fourth "shot" is applied (constituting the fourth stage in the innoculation of the tree) as shown more clearly in FIG. 12; and thereafter, the second cartridge is driven substantially flush with the surface of the tree trunk, indicating thereafter that the fourth stage has been reached in the particular treatment of the tree. This repeated hammering of cartridges into the tree for the successive injections of the liquid would not be as convenient and practical, using the relatively-flimsy plastic capsules heretofore resorted to in the prior art.

Any type of injection may be made into the tree, such as: an antibiotic, as for example, tetracycline; other medicines for cures as well as prevention; food supplements; hormone injections; and various minerals, as for example, magnesium, iron, sulfur, copper, etc. The particular injection (or series of injections) depends upon the diagnosis of the tree "doctor".

With reference to FIGS. 13-17, it will be appreciated that the teachings of the present invention may also be applied quite conveniently to relatively small trees by simply applying the cartridge of the present invention to a branch or twig, or by simply tapping into the root system of the tree. As shown more clearly in FIG. 13, the roots 27 of small trees are relatively close to (or in some cases partially above) the ground, and thus a root 28 (as shown in FIG. 14) may be gently lifted out of the ground so that its free end 29 is readily accessible. A tube 30 is provided, which is preferably flexible and molded from a suitable plastic material. The tube 30 has respective ends 31 and 32. The first end 31 is attached to the forward open end of the cartridge 10 by means of a first hose clamp 33, as shown in FIGS. 14 and 15. The second end of the tube is attached to the free end of the root by means of a second hose clamp 34, as shown in FIGS. 14 and 16. The hose clamps 33 and 34 are preferably of a relatively-inexpensive plastic construction.

As shown more clearly in FIG. 17, the needle 15 may be inserted into the rearward end portion of the cartridge (substantially in the same manner as shown in FIGS. 9-12 for the application to the tree trunk) and a suitable liquid is injected through the cartridge, through the tube, and into the free end of the root (or twig) of the tree. Since the tube is somewhat thin-walled and flexible, it may expand slightly—the degree of expansion in FIG. 17 being somewhat exaggerated for ease of illustration—to act as a reservoir from which the root may "feed" or "drink" as required.

Thus the cartridge of the present invention may be used in methods for applying liquid to the trunk, roots, branches or twigs of a tree (or other relatively-large plants).

By employing the teachings of the present invention, the efficiency of innoculating or otherwise treating trees is substantially improved, time savings are realized, and appreciable cost savings result.

Obviously, many modifications may be made without departing from the basic spirit of the present invention. Accordingly, it will be appreciated by those skilled in the art that within the scope of the appended claims, the invention may be practiced other than has been specifically disclosed herein.

What is claimed is:

1. The method of making a cartridge for use in injecting a liquid into a tree, comprising the steps of providing a rifle cartridge having a primer, removing the primer from the cartridge, such that the cartridge comprises a cylindrical shell having a central longitudinal opening therein, and such that the cylindrical shell further has an open forward end and an integral rearward portion, coating the outer surface of the cartridge, and inserting a room temperature vulcanizable material into the rearward portion of the cartridge and into a portion of the central longitudinal opening in the cylindrical shell.

* * * * *